UNITED STATES PATENT OFFICE.

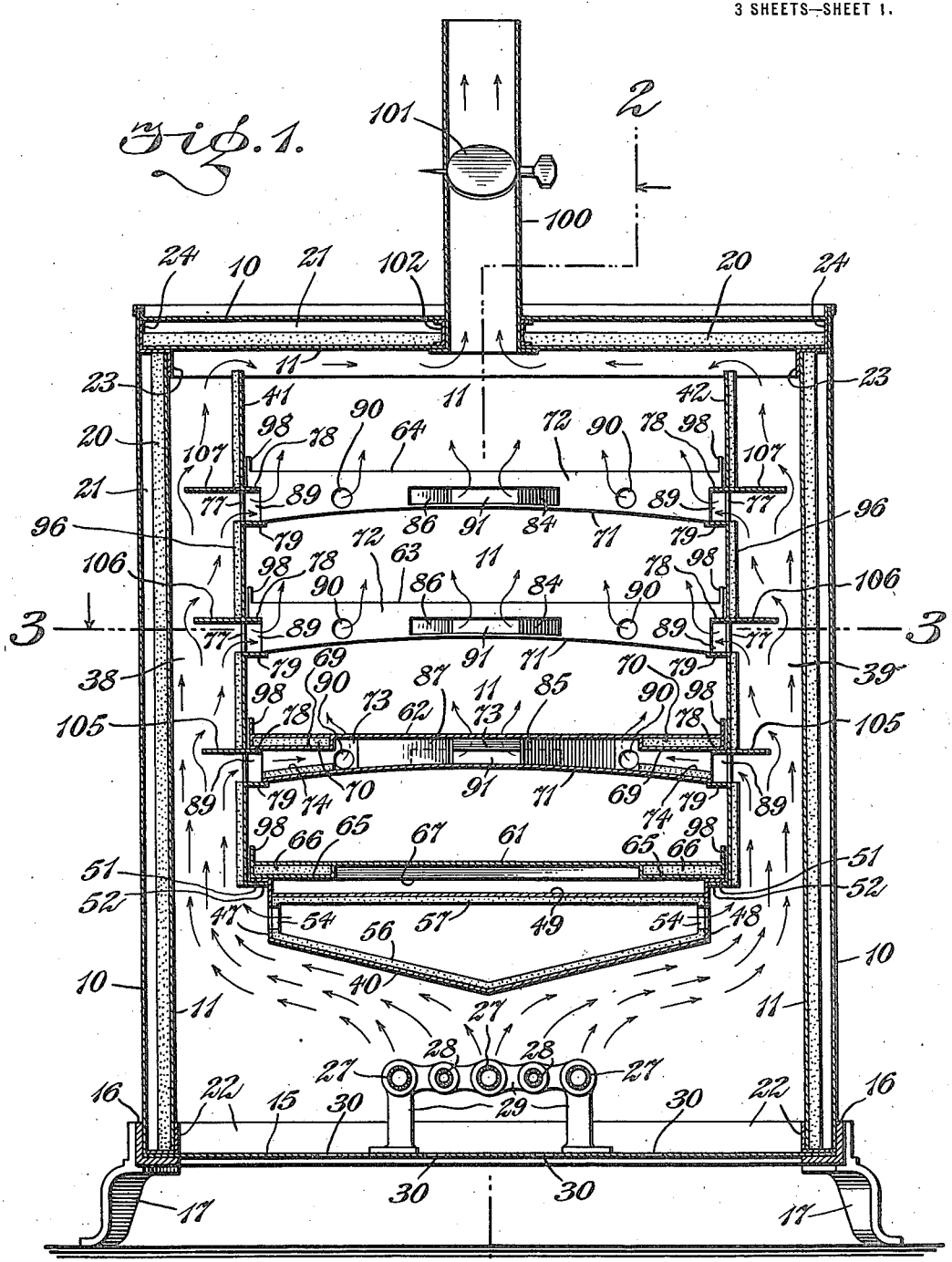

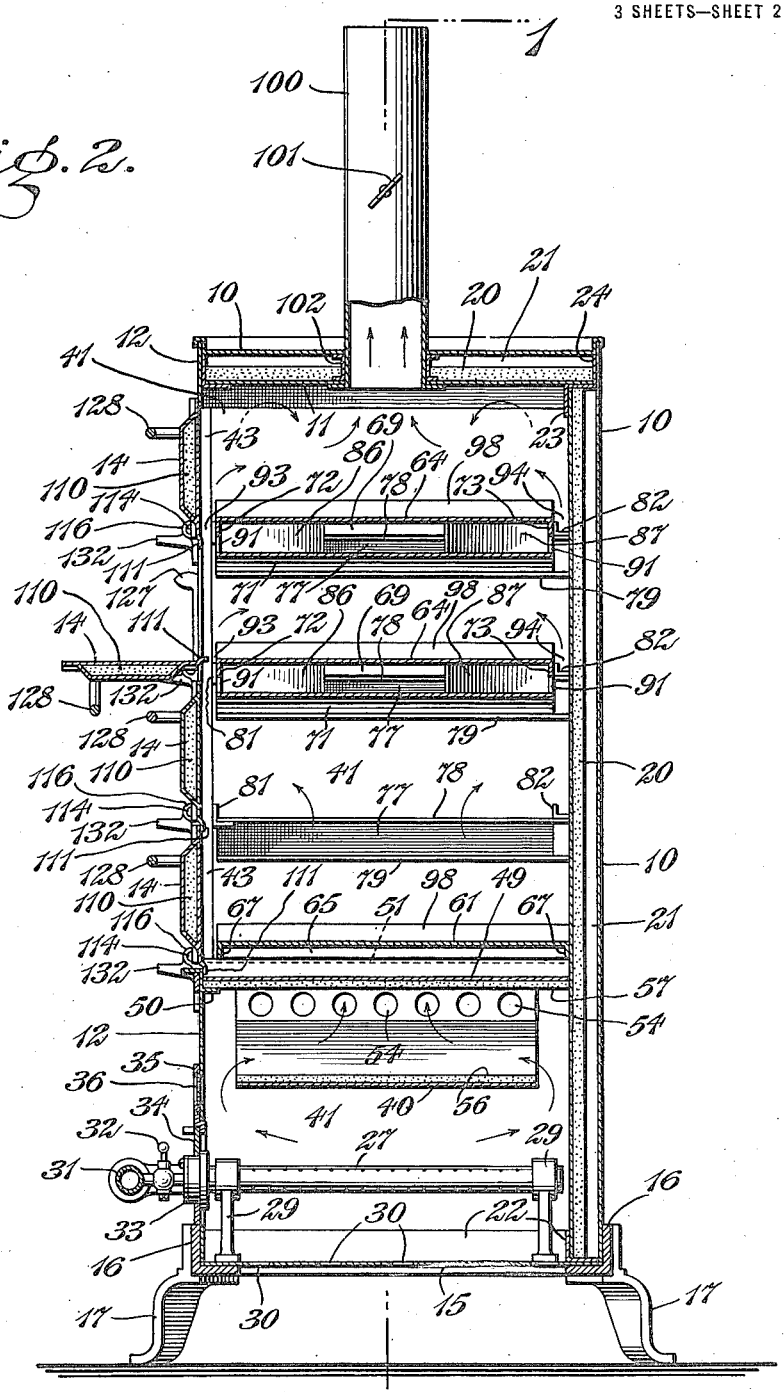

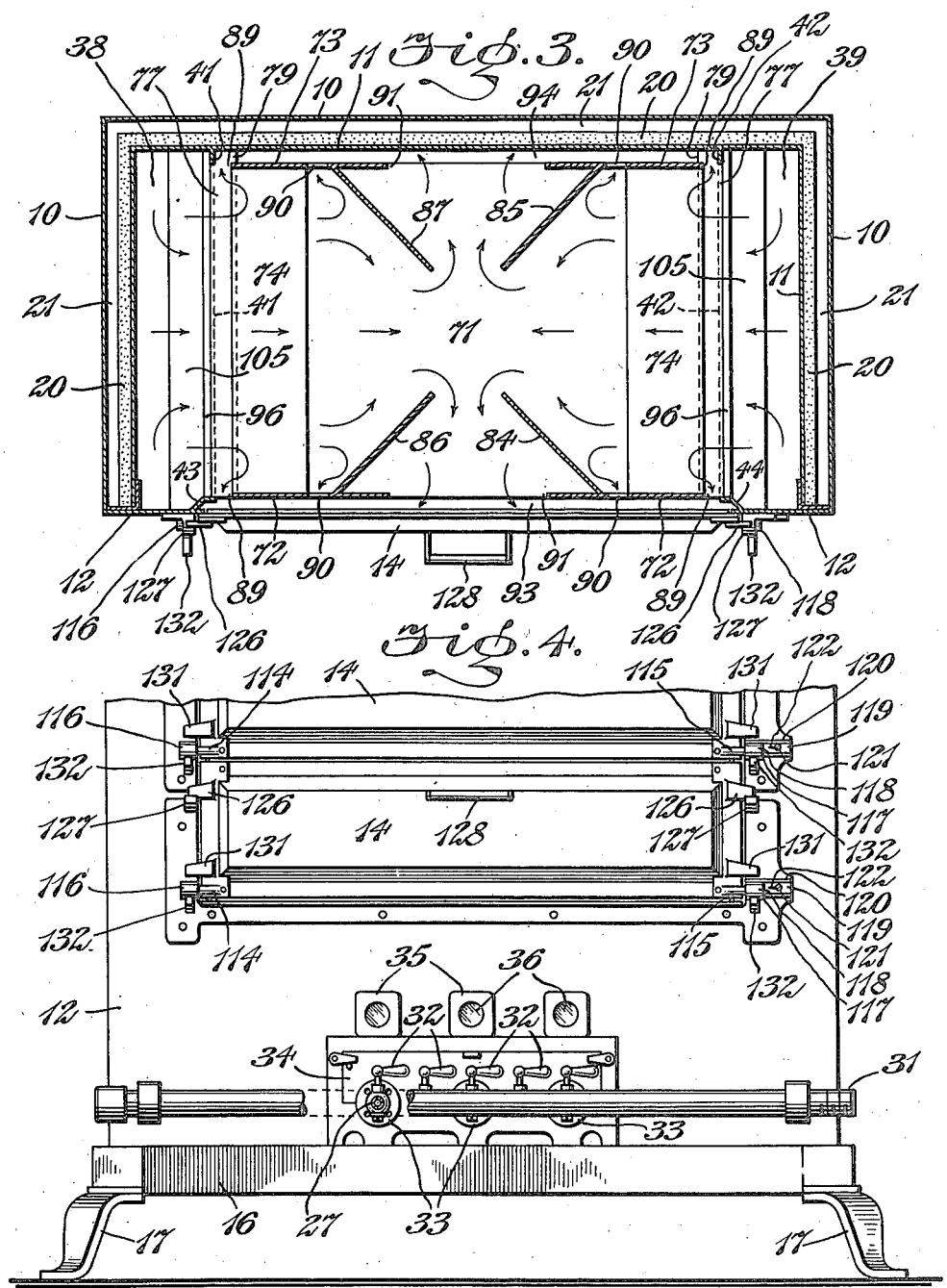

HENRY W. O'DOWD, OF JERSEY CITY, NEW JERSEY, ASSIGNOR TO WILLIAM M. CRANE COMPANY, A CORPORATION OF NEW YORK.

HEATING APPARATUS.

1,282,707.  Specification of Letters Patent.  Patented Oct. 22, 1918.

Application filed January 27, 1915. Serial No. 4,579.

*To all whom it may concern:*

Be it known that I, HENRY W. O'DOWD, a citizen of the United States, and a resident of Jersey City, county of Hudson, and State of New Jersey, have made certain new and useful Improvements in Heating Apparatus, of which the following is a specification.

The invention relates to stoves and similar apparatus adapted to the application of heat for cooking or baking purposes. More particularly, it relates to culinary appliances that are specially designed for operation with gaseous fuel.

The invention aims to provide a bake oven which is thoroughly effective and operable with ordinary sources of heat, but well suited at the same time for the economical consumption of gas as its fuel, whether in the native state or artificially produced.

One of the chief characteristics of the present invention is the unique method of circulation to which it subjects the caloric current and by which the distribution of heat is rendered positive and uniform throughout the oven. This is attained principally by the substitution for the common oven shelves hitherto employed, of hollow decks acting as division floors between superposed compartments that are heated by means of side flues, and affording passageways from one flue to the other and to the several compartments, so that the latter are enveloped by the caloric current and further caused to transmit it to one another consecutively.

Another important feature is the peculiar internal construction of the said hollow decks, whereby they are enabled to disseminate the heat perfectly from the center to the sides thereof, preparatively to its being discharged and diffused into their respective compartments.

A further feature of no less importance resides in the partial insulation of the said compartments from one another and from the heat flues, and also from the jacket or outer casing of the oven, which itself is insulated, all in order to conserve, control, and properly partition the heat units.

Still another feature of special moment is the provision of a sectional closure, so constructed and disposed that each compartment originally provided for in the oven has its own door, which when open may be used as a continuation of the compartment's deck, and besides can be detached to admit some large-sized object after removal of the deck and then replaced without the latter, thus permitting proportionate enlargement of the interior of the oven and the operation thereof with either single or multiple compartments, as may be dictated by convenience or otherwise.

These features, and others of minor import, have been incorporated in the form of the invention illustrated in the drawings hereto annexed, wherein—

Figure 1 is a vertical transverse section of the oven, taken on the line 1—1 of Fig. 2, looking rearward in the direction indicated by the arrow at the bottom of the latter-named view;

Fig. 2 is a sectional side elevation, taken on the line 2—2 of Fig. 1, looking toward the left, as pointed out by the upper arrow;

Fig. 3 is a sectional plan, the section being on the line 3—3 of Fig. 1, looking downward;

Fig. 4 is a broken front elevation, showing the bottom part of the oven, closed.

In its preferred embodiment, and as shown in the said drawings, the invention comprises a double-walled casing, composed of separated outer and inner plates 10 and 11, forming together the sides, back and top; one or more similar plates 12 standing in front, with an opening 13, closed by a plurality of doors 14; and a perforated plate 15, constituting the bottom. The casing as a whole is set within a rectangular base frame 16, supported from the floor by corner legs 17. This form of support is favored because in keeping with the lightness and elegance of the general structure, and further commends itself for its sanitary character.

The intervals between the various plates 10 and 11 aforesaid are partially filled with insulating material 20, and partly left unfilled therearound so as to form an air-space 21, within the top, back and sides of the casing, above described. The insulation may be of any available species,—for example, air-cell asbestos in the form of sheets, secured to the inner plates 11. As seen in Figs. 1 to 3, the asbestos-covered plates 11 are uniformly spaced from the outer plates 10, throughout the casing, by means of angle-iron retainers 22, 23 and 24. One member of these angular pieces is arranged to take under or over each inner plate, while another member thereof abuts against the outer plate directly opposite. The several retainers thus maintain the plates in a predetermined position relatively to each other, besides serving to consolidate the entire structure. At the same time, the insulation and the contiguous air-strata within the hollow walls of the casing operate to check or reduce the loss of heat by radiation from the oven, and thereby proportionately diminish the cost of maintenance in so far as the ordinary consumption of fuel is concerned. The oven not only is protected against heat radiation from within, but likewise remains unaffected by thermal conditions without, which assists in keeping it at an even temperature always. The saving of heat inside the oven naturally redounds to the benefit of the victuals or articles of food that are being cooked or baked therein, and meanwhile the absence of heat radiation outside renders it more comfortable for the oven attendant to attend to his or her duties, by moderating the heated atmosphere of the kitchen or bakeshop, particularly in warm weather.

By preference the oven is heated from the lower part of the said casing, which part hereafter will be referred to as the heat-generating chamber. Diverse sources of heat may be employed for the purpose in view, but as this improved oven is especially suited to the utilization of fuel-gas, either natural or manufactured, its adaptation thereto has been selected for illustration in the accompanying drawings. As represented in Figs. 1, 2 and 4, the equipment for the consumption of gaseous fuel comprises a set of drilled tubular burners 27, positioned parallel to one another, and lighted by intermediate pilots 28. These burners, with their adjuncts, extend through the middle portion of the heat-generating chamber, preferably from front to rear, and are mounted therein on transverse supports 29, resting upon the aforementioned perforated bottom plate 15, the openings in which, designated by the reference numeral 30, admit into the chamber the atmospheric air necessary to support the combustion. A feed-pipe 31 is attached in front for the conveyance of gas, with the usual complement of rotary plug valves 32, and air-draft regulators 33. A door 34 is further provided in the face wall of the chamber to facilitate the insertion or removal of the burners, and above the latter is a row of observation apertures 35, with mica panes 36, through which the attendant may note the condition and watch the action of the flames arising from the burning gas.

From the generating chamber the heat is directed laterally upward into side flues 38, 39, through the agency of a deflector 40, located in the central upper part of the said chamber. These flues are formed by raised partitions 41, 42, extending in height from the right and left of the said deflector, respectively, to a plane adjacent to the upper plate 11 of the casing, and in width from the inner back wall of the casing to the front thereof, where their outer edges are joined to the vertical edges of the door-opening 13, by means of angular strips 43, 44. The right and left sides of the casing, it is understood, form constituent parts of the said flues.

The deflector aforesaid includes an angular plate, indicated by the numeral 40, the apex whereof is inverted and disposed in a vertical plane bisecting the source of heat. Therefore, in the present embodiment of the invention, the angle of the said plate extends above and parallel to the middle burner of the set 27, before mentioned. Arranged in this manner, the deflector divides the heat units ascending from the burners into equal parts, which are diverted by the inclined faces of the angular plate and led toward the laterally-located flues 38, 39, on the right and left of the casing respectively. At suitable distances from these two sides of the casing the opposite edges of the plate 40 are turned upward, as at 47, 48, and made to support a horizontal plate 49, intended to form a floor for the interior of the oven, to wit, that part which is divided off the sides of the casing by the partitions 41, 42. To this end, the horizontal plate or floor 49 is extended the full depth of the oven, from the rear to the front of the outer casing, where the forward edge of the said floor rests upon a ledge 50, of the wall 12. On the right and left of this floor, the said edges of the angular plate 40 are carried up somewhat higher, and bent outwardly at the extremities to form flanges 51, arranged to bear upon inwardly-projected flanges 52, at the lower ends of the said partitions. A detachable suspending means is thus provided for the deflector, and a complete separation effected between the heat-generating chamber and the space intermediate of the partitions.

It will be seen, by referring to Fig. 2, that the width of the angular plate 40, measured along the apex thereof, is approximately equal to the length of the effective portion of the burners 27, and, in a corresponding ratio, the forward and rear edges of the said plate respectively stop short of the front and back walls of the casing. This allows some of the heat units, first met by the angular plate, to rise beyond its said edges both forwardly and rearwardly of the generating chamber, thence to flow into and fill the body of the deflector, that is, the hollow space intervening between the inner angle of the plate 40 and the floor 49 thereabove, where these deviated heat units become temporarily entrapped. From this confined space, the heat units are permitted to issue in reduced streams into the side flues 38, 39, through ports 54, provided in the opposite upturned ends 47, 48, of the deflector.

Owing to its close proximity to the gas-burners in the upper part of the heat-generating chamber, it is important to have the deflector, and particularly the depending angular portion thereof, of such weight and material as will preclude burning at this point. The plate 40 is accordingly made of stout sheet-metal, and lined as at 56, Figs. 1 and 2, with some incombustible substance, preferably asbestos, which is extended at the sides to cover also the up-turned ends 47, 48, between and around the ports 54 therein. The horizontal plate or floor 49 is likewise lined underneath, as at 57, partly for a similar reason. By virtue of this construction, the parts here referred to are saved from the injurious effect that might otherwise be produced thereon by the flaming burners, and inasmuch as the floor does not allow any escape of the heat upward at the front or back of the casing, the said parts eventually discharge into the side flues all the heat which they do not themselves absorb.

Above the floor 49, the interior of the oven is divided into a number of superposed baking compartments, by means of hollow decks or shelves 61, 62, 63, and 64, extending across the space comprised between the partitions 41 and 42. Of these decks or shelves, the lowermost one simply includes a flat plate (61) folded or bent under at the sides to form oblong rectangular cases 65, that are filled with heat-absorbing material 66, such as asbestos fiber, and joined together by transverse flanges 67, provided at the front and rear edges of the plate on the underside. Figs. 1 and 2. A desirable rigidity is imparted to the deck 61 through the medium of the combined flanges and cases, and the latter besides afford convenient slides by means of which the deck is positioned and supported upon the flanges 51, near the bottom of the partitions 41, 42, when inserted in its allotted place within the oven, as shown. A central hollow space bounded by the said cases and their connecting flanges, is thereby added also to the interval between the floor 49 and the said deck, due to the floor being depressed or located below its suspending means, which rise to a slightly greater height, as previously explained.

The top part of half of each one of the upper decks, as herein shown, is constructed similarly to the lowermost deck 61 just described, to the extent that the said upper decks all have flat-surfaced plates, respectively numbered 62, 63, and 64, and underlying cases 69, at the right and left, filled with asbestos 70. In addition, the upper decks are furnished each with a crown-shaped or upwardly-curved bottom plate 71, spaced from and united with the flat plate (62 or 63 or 64) above, by means of marginal cross pieces 72, 73, located at the front and rear edges, respectively. Both the right and left sides of the bottom plate 71 are covered with asbestos strips 74, opposite the cases 69. The curved bottom plate is also spaced away at both these sides from the superjacent flat plate, so as to leave a continuous passage between the cases 69 and the strips 74 and through the interior of each upper deck. Thus the several upper decks or shelves are constituted into open-sided hollow bodies separating the superposed baking compartments hereinbefore mentioned.

It will be noticed that while said bottom plates 71 are shown as being imperforate throughout their surfaces, it is obvious that because of the tendency of the heat units to rise and therefore closely follow the bottoms of the top plates, said bottom plates 71 need not be imperforate but may be formed with openings.

Transverse slots 77 are formed at opposite points in the partitions 41, 42, to provide a direct communication between the lateral flues 38, 39, and the corresponding ends of the passageways afforded by the said hollow decks 62, 63 and 64. The latter are sustained in their respective positions, in registry with the said slots, each by two rests 78, 79, consisting of flange-like supports that project inwardly from the said partitions, one above and one below each slot. As indicated in Figs. 1 and 2, the cases 69, pertaining to the upper half of each hollow deck, bear upon a pair of rests 78, on the right and left respectively, while the extremities of the curved bottom plate 71 are supported by a similar pair of rests 79. All of the hollow decks are also spaced from the casing, about equally at the front and back, by stops 81, 82, placed on the rests 78, two such stops being provided on each side. Mounted in this manner, the hollow decks can be easily inserted, and as conveniently removed for repairs or cleaning, or whenever it is desired to increase the height of some of the baking compartments for any particular purpose.

A set of deflecting bars 84, 85, 86, 87, is provided in each hollow deck, in order to avoid centralization of the heat units within the same as they enter from the oppositely-located flues 38, 39. Figs. 1, 2 and 3. As detailed in the latter-named view, there are four such bars used preferably, and they extend diagonally and quasi-radially from the front and rear edges of the hollow decks between the top and bottom plates thereof, but terminate short of the center of these plates. Exits for the heat admitted into the several hollow decks are formed in both the front and back, consisting of notches or openings 89, produced by cutting away the ends of the marginal pieces 72, 73; intermediate port-holes 90, adjoining the outer ends of the said deflecting bars; and horizontal slots 91, facing each other centrally of the decks. The heat units, it will be observed, encounter the deflectors 84, 85, and 86, 87, in pairs on opposite sides, upon entering the hollow decks from the right and left flues, respectively. Part thereof immediately flows out through the notches or openings 89; another part is reflected back by the deflectors and issues through the port-holes 90; and still another part passes on to the middle of the deck, across the gaps intervening thereat between the deflectors' ends, whence it is directed also outward by way of the slots 91. Emerging out of the exits 89, 90, 91, the heat units ascend into the interior of the oven, and its superposed baking compartments, along the spaces left vacant, as at 93, 94, between the series of decks and the forward and rear walls of the oven's outer jacket or casing, which spaces are regulated in depth by the aforesaid stops 81, 82, at the opposite ends of the rests 78, and constitute front and back flues for the said baking compartments.

Incidentally the said deflectors serve the additional purpose of strengthening the hollow decks, in so far as they act like braces between the top and bottom plates and their marginal cross-pieces, to all of which they afford a central support commensurate with the otherwise depressible area inclosed thereby. The arched or crown-shaped bottom plates also contribute in solidifying the structure, and introduce into a portable gas-consuming apparatus the feature of construction formerly used only in the most expensive built-in coal-ovens. Moreover, the employment of the crown or arch in the bottom plates increases the thickness of the decks at the sides, both right and left, and accordingly facilitates lodgment therein of the insulating, heat-absorbing strips 66, 70, and 74, while permitting the formation of passages of adequate dimensions throughout the hollow decks.

The said strips 66, 70 and 74, it is understood, equalize the temperature within the decks, as obviously the sides thereof, which are closer to the lateral flues than the middle portions, would normally form the hottest parts of the oven, but are moderated by the insulators or heat-absorbers. For a like object, the outer surfaces of the partitions 41 and 42 are also insulated each by an asbestos covering 96, which protects the interior of the oven against excessive heat radiation from the inner plates 11 of the outer jacket or casing.

Vertical flanges 98 are formed on the right and left hand sides of all the decks, 61—64, as represented in Fig. 1. These flanges ward off unnecessary contact of the pans or other articles on the decks with the partitions of the oven, and prevent dust, crumbs, or similar food particles from falling or being brushed into the interstices between the several decks and the said partitions, and accumulating upon the deck supports.

As before stated, the partitions 41, 42, extend up to a plane adjacent to the top plate 11 of the outer casing of the oven, where the side flues 38, 39 terminate. The space above the partitions is unobstructed and communicates with a central outlet-pipe 100, furnished with a damper 101. The pipe 100, at its lower end, passes through both the outer and inner top plates 10, 11, of the casing, as also through the insulating material 20 and air-space 21 therebetween, and is fitted in a double-flanged collar or annular support 102, set inside the latter-named plates so as to consolidate the same. From the top of the casing the outlet-pipe leads to a chimney (not shown).

Naturally, the heat produced in the generating chamber tends to rise into the lateral flues 38, 39, to which the major portion thereof is first directed by the before-described deflector 40. Unless this heat were checked, its distribution within the oven would be very imperfect, since most of it would immediately ascend to the upper extremities of the side flues, fill more or less the top part of the casing, and seek an egress through the outlet-pipe 100, and the chimney. The uppermost baking compartment would become excessively hot, as a result, whereas the lowermost one would remain comparatively cool. To remedy this, both the right and left flues 38, 39, are provided with gradients, formed by horizontal plates 105, 106, 107, projected outwardly from the partitions 41, 42. These gradients increase progressively in width from the lower portions of the said side flues upward, and are located at or near the upper edges of the transverse slots 77 in the said partitions, where communication is obtained between the side flues and the hollow decks. The various gradients arrest each a proportionate quantity of the heat units ascending from the generating chamber, and deflect them into the series of hollow decks, successively. Thence the retarded units go up the front and back interior flues 92, 93, communicating with the superposed baking compartments. Each gradient is gaged to intercept the required percentage of heat units for its corresponding side of the hollow deck positioned at the same level. There is no pocket or dead stratum of caloric at the top, as nearly all the heat units become diffused throughout the oven before the top is reached. Only a narrow passage is left between the latter and the upper edge of each partition, which is sufficient for the upflowing heat units to escape from the side flues into the uppermost baking compartment, and out through the pipe 100. The damper 101 in this pipe controls the quantity of caloric allowed to escape to create circulation, and provides the means of regulating the general temperature of the oven, when properly manipulated in connection with the gas-burner valves below.

The course of the caloric current is indicated by arrows, in Figs. 1, 2 and 3. As there represented, the heat units rising from the generating chamber are forthwith diverted into the flues 38, 39, mostly by the sides of the deflector 40, but to some extent also through the latter, as previously explained. While ascending in the side flues, they become divided into separate columns, through the action of the gradients. Only the outermost column on each side has a substantially direct path up and out of its own flue, to the exterior pipe 100. The inner columns are consecutively stopped by the respective gradients, and as a consequence deviate toward the hollow decks 62, 63, 64, through the slots 77, across the partitions 41, 42. How the deviating heat units are decentralized, transmitted, and diffused in the baking compartments, by means of these decks and the front and back flues 93, 94, has already been brought out.

Each one of the said baking compartments, it will be noticed, is closed at the sides by the right and left partitions 41, 42, and at the top and bottom by the decks 61—64 dividing the interior of the oven. The front and back of each compartment, on the contrary, are open to the interior flues 93, 94, and analogously the hollow decks are in communication with the lateral flues 38, 39. The hollow decks are the distributing media through which the heat units are conveyed from the side flues into the front and back flues, that is, from the generating chamber to the baking compartments, and the latter are further heated in pairs by the intermediate decks, since the lower section of each hollow deck constitutes the roof of the compartment next below, while the upper section thereof forms the flow of the compartment immediately above. Some of the heat is absorbed by the material entering into the manufacture of the hollow decks, and is again transmitted by conduction or radiation or both to the food in process of cooking.

It has been demonstrated in practice that the distribution of the heat is rendered positive and uniform by following the unique and novel method of circulation herein described. Being of equal intensity throughout the oven, the heat has the same action and produces like effects on every part of the food during all stages of the cooking operation. Thus, for example, if a batch of bread is placed in the oven, the tops and bottoms of the loaves will be baked evenly and all at the same time, because, assuming the heat is strong enough to color the tops, it will obviously be sufficient to color the bottoms. Simultaneously, the heat vented into the front and back flues will cook in a similar degree the ends or sides of loaves presented toward them, while the radiated heat which cooks the bottoms, being transmitted into the space between the bread pans or intermediate of the loaves when no pans are used, bakes as well such portions of the loaves as happen to be turned inward. Experience has taught that with this construction it is altogether unnecessary to shift batches in the oven in order to bake bread thoroughly, because the heat is so equally distributed that the batches bake perfectly as set in their original positions. What is said here of bread applies also to the baking of all kinds of pastry, the cooking of roast meats, etc.

The doors 14 employed to shut the opening 13, as hereinbefore referred to, are specially designed and constructed, first, to afford a separate closure for each baking compartment; secondly, to open from the top downward, by dropping arcuately to the plane of the compartment's deck or floor, in each instance, so as to facilitate the lodging and removal of the batches baked thereon; and thirdly, to admit of being detached individually as may be required in the operation of the oven, for the convenient introduction of food articles exceeding a given size, or for other reasons.

It should now be apparent that the present invention is of a practical character, well adapted to discharge its various functions, and especially fitted for the economic use of gas, which as a fuel may be said to be comparatively inexpensive, abundant, and nearly everywhere at the consumer's command. At the same time, it will be observed that numerous changes can be effected in the form and structure of the invention as exemplified by the annexed drawings, without deviating appreciably from its basic principle or sacrificing any of its chief advantages. Therefore, let it be understood that I do not desire to limit myself to the particular construction herein shown and described, but reserve the right to all such modifications of the invention as it may be deemed advisable to make and shall come fairly within the scope of the subjoined claims, or any of their distinct clauses.

I claim:

1. A bake oven comprising a heat conducting flue, a compartment lateral to the same, a hollow deck, and means in the latter directing the heat from said flue centrally through said deck and diverting it at opposite sides thereof into said compartment.

2. A bake oven including an inner compartment, heat flues on opposite sides thereof, a hollow deck having inlets communicating with said flues and outlets leading into said compartment, and oppositely disposed diverting means in said deck operating first to direct the heat from the inlets centerward therein and thence to deflect it toward the compartment through said outlets.

3. A bake oven including an inner compartment, heat flues lateral thereto, a hollow deck for said compartment having inlets in the sides adjoining said flues and outlets in opposite edges between the same, and oppositely disposed deflecting bars within said deck inclined radially inward from said edges, said bars terminating short of the center of the deck.

4. A bake oven including an inner compartment, a horizontally suspended hollow deck therefor having inlets at opposite sides and outlets in the opposed edges between said sides, heat flues communicating with said inlets, and braces within said deck serving to deflect the heat currents centerward therein and thence toward the compartment through said outlets.

5. A bake oven including an inner compartment, heat flues on opposite sides thereof, a hollow deck, rests for the ends of the latter on said flues, heat absorbers interposed between said deck and said rests; and flanges extending under the surface of the deck beneath said absorbers.

6. A bake oven including an inner compartment, heat flues lateral thereto, a hollow deck for said compartment between said flues, cases wherewith said deck is supported adjacent to the flues, and insulating material in said cases.

7. A bake oven including an inner compartment, heat flues on opposite sides thereof, a hollow deck for said compartment, supports for the ends of said deck on said flues, insulating cases under the deck bearing upon said supports, and rigid connections extending longitudinally of the deck between said cases.

8. A bake oven comprising a heat chamber, vertically disposed flues on opposite sides thereof, a plurality of superposed compartments, removable hollow decks having inlets adapted to register with the flues, said decks being also formed with outlets designed to discharge into said compartments, and deflectors in said decks operating to lead the heat currents centrally thereinto from the opposite flues and thence laterally into the compartments.

9. In a stove structure, a deck including spaced-apart plates; and means between the plates for directing heat currents centrally through the deck and diverting them at opposite sides thereof.

10. In a stove structure, a deck including spaced-apart plates; and means between the plates for directing heat currents centrally through the deck and diverting them at opposite sides thereof, said means comprising deflectors connecting the spaced-apart plates and extending radially therebetween.

11. In a stove structure, a deck including spaced-apart plates; means between the plates for directing heat currents centrally through the deck and diverting them at opposite sides thereof; and a case for heat absorbing material between the plates.

12. In a stove structure, a deck including spaced-apart plates; means between the plates for directing heat currents centrally through the deck and diverting them at opposite sides thereof; and side walls connecting said plates and provided with openings therein.

13. In a stove structure, a deck including spaced-apart plates; means between the plates for directing heat currents centrally through the deck and diverting them at opposite sides thereof; and side walls connecting said plates and provided with openings therein, certain of said side walls terminating short of one of the plates to constitute a supporting member.

14. In a stove structure, a deck including spaced-apart plates; means between the plates for directing heat currents centrally through the deck and diverting them at opposite sides thereof; side walls connecting said plates and provided with openings therein, certain of said side walls terminating short of one of the plates to constitute a supporting-member; and flanges disposed on certain of said plates.

15. A stove structure including an outer casing, a source of heat, a compartment provided with openings, and flues around the same; a deck comprising spaced-apart plates; side walls connecting the plates and provided with openings; one of said plates being extended beyond the extremities of the side walls to constitute a supporting-member; a support for said member; and means for directing heat currents into said deck beneath said supporting-member.

16. A stove structure including an outer casing, a source of heat, a compartment provided with openings, and flues around the same; a deck comprising spaced-apart plates; side walls connecting the plates and provided with openings; one of said plates being extended beyond the extremities of the side walls to constitute a supporting-member; a support for said member; means for directing heat currents into said deck beneath said supporting-member; and means for deflecting the heat at opposite sides of said deck.

17. A stove structure including an outer casing, a source of heat, a compartment provided with openings, and flues around the same; a deck comprising spaced-apart plates; side walls connecting the plates and provided with openings; one of said plates being extended beyond the extremities of the side walls to constitute a supporting-member; a support for said member; means for directing heat currents into said deck beneath said supporting-member; and means comprising deflectors for directing heat currents at opposite sides of said plates.

18. A stove structure including an outer casing, a source of heat, a compartment provided with openings, and flues around the same; a deck comprising spaced-apart plates; side walls connecting the plates and provided with openings; one of said plates being extended beyond the extremities of the side walls to constitute a supporting-member; a support for said member; means for directing heat currents into said deck beneath said supporting-member; and means comprising deflectors for directing heat currents at opposite sides of said plates, said side walls being also provided with openings adjoining the outer ends of said deflectors.

19. A stove structure including an outer casing, a source of heat, a compartment provided with openings, and flues around the same; a deck comprising spaced-apart plates; side walls connecting the plates and provided with openings; one of said plates being extended beyond the extremities of the side walls to constitute a supporting-member; a support for said member; means for directing heat currents into said deck beneath said supporting-member; and baffles in said flues for directing heat currents into said decks, said baffles being proportioned in area to the position of the baffle in the flue.

20. In a stove structure including, a source of heat, and a compartment; a bottom plate comprising a top member; extensions underlying said top member and constituting cases for insulating material; and a side flange connecting each case.

21. A stove structure including an outer casing, a source of heat, a compartment provided with openings, and flues around the same; a deck comprising spaced-apart plates; side walls connecting the plates and provided with openings; one of said plates being extended beyond the extremities of the side walls to constitute a supporting-member; a support for said member; means for directing heat currents into said deck beneath said supporting-member; baffles in said flues for directing heat currents into said decks, said baffles being proportioned in area to the position of the baffle in the flue; and a deflector arranged in spaced relation to said bottom plate.

22. In a stove structure, a deflector comprising an angular plate; extensions on said plate each provided with an opening; a second plate disposed on said extensions in spaced relation to the extremities thereof; and outwardly extending portions of the extensions arranged at an angle thereto to constitute a support.

23. In a stove structure, a deflector comprising an angular plate; extensions on said plate each provided with an opening; a second plate disposed on said extensions in spaced relation to the extremities thereof; outwardly extending portions of the extensions arranged at an angle thereto to constitute a support; and heat insulating material disposed between the plates.

24. In a stove structure including an outer casing, a source of heat, a compartment, flues around said compartment, and a supporting member disposed on said compartment; a deflector comprising an angular plate; extensions on said plate each provided with an opening; a second plate disposed on said extensions in spaced relation to the extremities thereof; said extremities being bent outwardly to constitute ledges, each being disposed upon the support on the compartment; and a top plate disposed upon said support and each ledge whereby a space is provided between the top of the deflector and the bottom plate.

25. In a stove structure including a source of heat, a compartment, an outer casing, and flues around said compartment; angle plates disposed on said compartment and constituting a support; a bottom plate disposed on said support; a deflector comprising an angle plate for diverting heat currents from said source of heat; extensions on said plate provided with openings; a second plate disposed on said extensions in spaced relation to the extremities thereof; said extremities being bent outwardly and disposed on said angle plates to constitute a support for said deflector; and stops disposed on said angle plates to position the deflector within the casing.

In testimony whereof, I have signed my name to this specification, in the presence of two subscribing witnesses.

HENRY W. O'DOWD.

Witnesses:
E. P. BERNHARDT,
LESTER C. TAYLOR.